US009114840B1

(12) United States Patent
Turner et al.

(10) Patent No.: US 9,114,840 B1
(45) Date of Patent: Aug. 25, 2015

(54) AERODYNAMIC STORAGE FOR FLUID BOTTLES

(71) Applicant: Airo Importation Inc., Escondido, CA (US)

(72) Inventors: Craig V. Turner, Escondido, CA (US); Patrick B. Crosby, San Diego, CA (US)

(73) Assignee: Airo Importation Inc., Escondido, CA (US)

( * ) Notice: Subject to any disclaimer, the term of this patent is extended or adjusted under 35 U.S.C. 154(b) by 0 days.

(21) Appl. No.: 14/482,747

(22) Filed: Sep. 10, 2014

(51) Int. Cl.
*B62J 11/00* (2006.01)
*B62J 9/02* (2006.01)
*B62J 9/00* (2006.01)

(52) U.S. Cl.
CPC . *B62J 11/00* (2013.01); *B62J 9/005* (2013.01); *B62J 9/02* (2013.01); *Y10S 224/926* (2013.01)

(58) Field of Classification Search
CPC .......... B62J 11/00; B62J 9/02; Y10S 224/926
USPC .......................................................... 224/414
See application file for complete search history.

(56) References Cited

U.S. PATENT DOCUMENTS

| 4,733,907 | A | * | 3/1988 | Fellenbaum | 297/188.01 |
| 5,110,020 | A | * | 5/1992 | Uhl | 224/414 |
| 5,170,981 | A | * | 12/1992 | Lin | 248/311.2 |
| 5,217,116 | A | * | 6/1993 | Ku | 206/374 |
| D346,489 | S | * | 5/1994 | Bean et al. | D7/709 |
| 5,803,328 | A | | 9/1998 | Nakahara | |
| 6,427,890 | B1 | | 8/2002 | Meng | |
| D505,837 | S | * | 6/2005 | Lima | D7/608 |
| 7,819,413 | B2 | | 10/2010 | White | |
| 8,066,296 | B2 | | 11/2011 | White | |
| D654,334 | S | * | 2/2012 | Gispert | D7/709 |
| 8,757,413 | B1 | * | 6/2014 | Kephart | 220/23.83 |
| 8,985,409 | B2 | * | 3/2015 | Willows et al. | 224/148.4 |
| 2009/0145942 | A1 | | 6/2009 | Rice | |
| 2010/0257973 | A1 | | 10/2010 | White | |
| 2011/0121044 | A1 | | 5/2011 | Schopf | |
| 2012/0061435 | A1 | | 3/2012 | Lavery | |
| 2013/0307246 | A1 | * | 11/2013 | Jankura et al. | 280/281.1 |

FOREIGN PATENT DOCUMENTS

| EP | 1886906 A1 | 2/2008 |
| EP | 1886906 A1 | 2/2008 |
| WO | WO 2014060829 A3 * | 7/2014 |

* cited by examiner

*Primary Examiner* — Justin Larson
(74) *Attorney, Agent, or Firm* — San Diego IP Law Group LLP

(57) ABSTRACT

The present invention provides an aerodynamic storage accessory for road, mountain, triathlon, and electric bikes. The aerodynamic storage is located downwind from the bottle and an optional bottle carrier, and does not serve as a fairing. In an embodiment of the invention, the aerodynamic storage comprises a flexible pouch that is smooth on all surfaces and tapers off at its backend. Air flows around it smoothly as the bicycle moves forward. The aerodynamic storage of the present invention can be attached anywhere to the frame, aero bars, saddle, saddle post, or any other location on a bicycle.

15 Claims, 9 Drawing Sheets

AERODYNAMIC STORAGE FOR FLUID BOTTLES

BACKGROUND OF THE INVENTION

1. Field of Invention

The present invention relates to fluid hydration and storage systems for bicycles, and more particularly to an aerodynamic storage for fluid hydration bottles and bladders.

2. Description of Related Art

Bicycle and triathlon races are popular all over the word, especially in Europe. Road bicycle racing involves both team and individual competitions, and range from one-day road race, criterium, and time trial to multi-stage events like the Tour de France. Bicycle racing is recognized as an Olympic sport. Mountain bike races are held off-road and involve a high degree of technical riding.

A triathlon is a multiple-stage competition involving the completion of three continuous and sequential endurance disciplines. While many variations of the sport exist, a traditional triathlon involves swimming, cycling, and running in immediate succession over various distances. Triathlon races vary in distance. An Ultra Distance triathlon or "Ironman" involves a 3.8 kilometer (2.4 mile) swim, a 180.2 kilometer (112.0 mile) bike, and a 42.2 kilometer (26.2 mile) run (full marathon). Any participant who manages to complete an Ultra Distance triathlon within 17 hours becomes an Ironman.

In competitive racing, road, mountain, and triathlon bikes are permitted to carry, among other things, hydration bottles and bladders, and storage modules. Hydration bottles or bladders can hold fluids such as water or sport drinks to replenish water, carbohydrates, and/or electrolytes lost in a rider's sweat. Storage modules can hold repair items (e.g., spare tubes, inflators such as $CO_2$ cartridges or repair foam, tools, or tire levers), personal items (e.g., keys, phone, money, or identification card), and/or food, among other things.

Competitive cyclists and triathletes are always looking for ways to improve performance within the confines of the rules—it is generally easier to increase aerodynamic efficiency than to increase power. Studies have shown that the bicycle accounts for approximately twenty-five percent (25%) of overall drag—the cyclist accounts for the other seventy-five percent (75%). Aerodynamic carriers for food, water, and cycling provisions maybe attached to or be an integral part of a bike if they meet bicycle specifications and rules imposed by an applicable governing body such as USA Triathlon (USAT) or World Triathlon Corporation (WTC). For example, USAT and WTC bicycle specifications prevent the use of a protective shielding, e.g., fairing, to reduce resistance. Permissible aerodynamic carriers reduce drag and thereby, increase the efficiency of a competitive rider.

SUMMARY OF THE INVENTION

The present invention overcomes these and other deficiencies of the prior art by providing an aerodynamic storage accessory for road, mountain, triathlon, and electric bikes. The aerodynamic storage is located downwind from a fluid container, e.g., bottle or bladder, and an optional fluid container carrier, and does not serve as a fairing. In an embodiment of the invention, the aerodynamic storage comprises a flexible pouch that is smooth on all surfaces and tapers off at its backend. Alternatively, a rigid structure may be used. Air flows around the aerodynamic storage smoothly as the bicycle moves forward. The aerodynamic storage of the present invention can be attached anywhere on a bicycle.

In an embodiment of the invention, an aerodynamic storage accessory for a bicycle comprises: a front section, two side sections, a bottom section, an aperture section, a top section, and a rear section; wherein the front section, the two side sections, and the aperture section form an aperture for receiving a fluid bottle; wherein the two side sections, the aperture section, the bottom section, and top section form a storage compartment; and wherein the two side sections taper off to the rear section. The aerodynamic storage accessory may further comprise a zipper located on the top section and rear section for opening and closing the storage compartment, and a zipper pull, wherein the top section comprises a Velcro strip for securing the zipper pull to the top section. The storage compartment can be formed as a pouch. The two side sections each include a pocket. The aperture can be configured to receive a bottle carrier. The bottle carrier can be affixed to a frame of the bicycle through the front section. Stitching can be used to join together two or more of the sections selected from the group consisting of: the front section, two side sections, the bottom section, the aperture section, the top section, and the rear section. The aerodynamic storage accessory may further comprise a lid for closing a top of the aperture. The lid can be spring activated and automatically closes when a fluid bottle is not present.

In another embodiment of the invention, an aerodynamic storage accessory for a bicycle comprises: a cylindrical section and a rear section, wherein the cylindrical section and rear section form an aperture for receiving a horizontal fluid container; wherein the rear section comprises a storage compartment; and wherein the rear section has an aerodynamic shape. The aerodynamic storage accessory may further comprise a zipper located on the cylindrical section for opening and closing the storage compartment, and a zipper pull, wherein the cylindrical section comprises a Velcro strip for securing the zipper pull to the cylindrical section. The storage compartment can be formed as a pouch. The rear section has a rounded edge and slopes upward from front to rear.

An advantage of the present invention is that it reduces drag of a fluid bottle while still meeting competitive bicycle specifications such as those imposed by USA Triathlon. The aerodynamic storage decreases the fluid bottle's coefficient of drag, which reduces air resistance on an object thirty to fifty percent (30-50%).

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
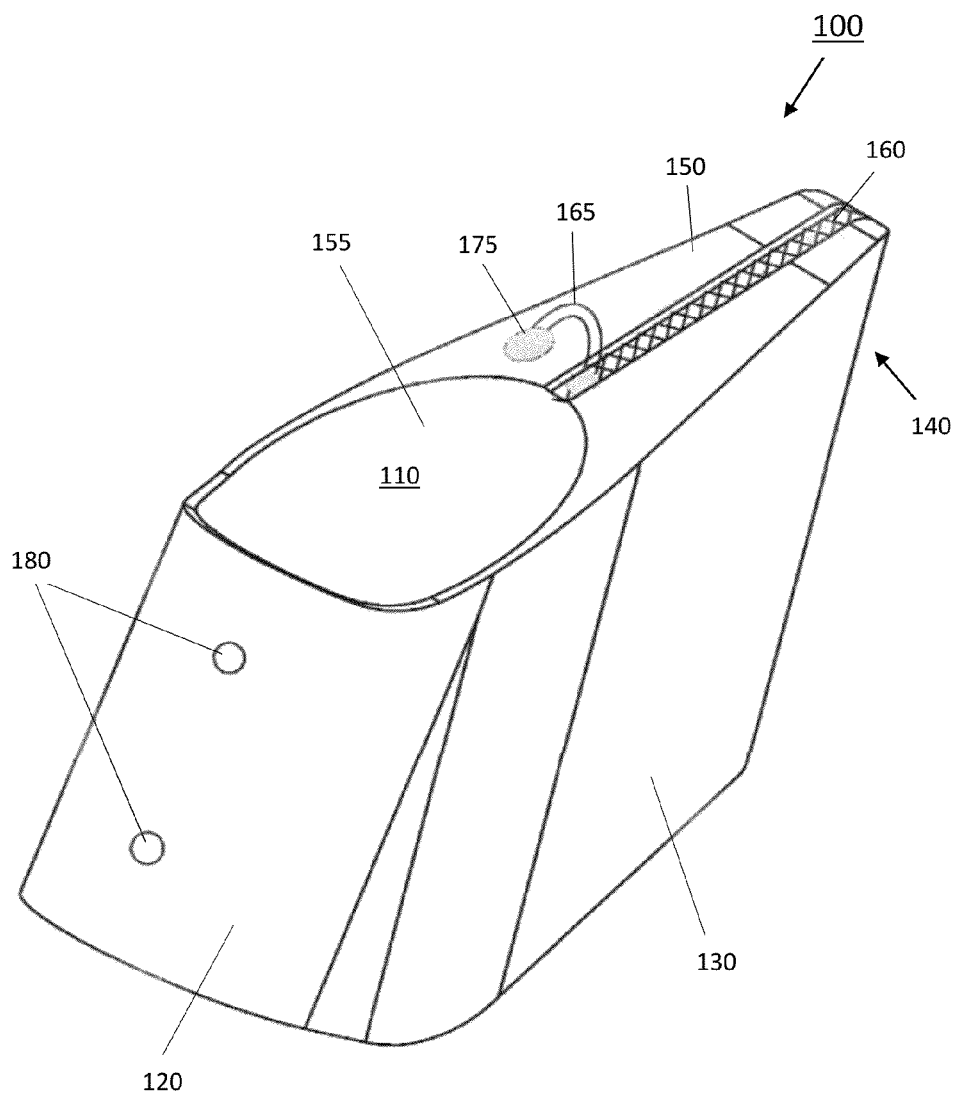
FIGS. 1-3 illustrates an aerodynamic storage for a fluid bottle according to an embodiment of the invention.

Preferred embodiments of the present invention and their advantages may be understood by referring to FIGS. 1-10, wherein like reference numerals refer to like elements. Although the present invention is described in the context of an aerodynamic storage for standard three inch (3") diameter fluid bottles, the dimensions of the present invention can be altered to fit variously shaped bladders or bottles (as well as bottle carriers or "cages") such as, but not limited to commercially available sport drink bottles (e.g., Gatorade® or Powerade®), aerodynamic bottles, and other fluid bottles, the identification of which is readily apparent to one of ordinary skill in the art.

The aerodynamic storage of the present invention reduces drag of a fluid bottle while still meeting competitive bicycle specifications such as those imposed by USA Triathlon (USAT) or World Triathlon Corporation (WTC). No protective shielding or fairing is used. Air resistance, i.e., drag, is reduced by attaching an aerodynamically shaped storage to a fluid bottle (and in some cases, its respective carrier or "cage"). In other words, the aerodynamic storage decreases the fluid bottle's coefficient of drag, which in turn reduces the overall drag of the object. The aerodynamic storage is located downwind from the bottle and bottle carrier, which is optional, and does not serve as a fairing. In an embodiment of the invention, the aerodynamic storage comprises a flexible pouch that is smooth on all surfaces and rounded on its bottom side, and tapers off at its backend. Air flows around it smoothly as the bicycle moves forward. The aerodynamic storage of the present invention can be included as part of or coupled to a fluid bottle carrier attached anywhere on any type of bicycle including, but not limited to road, mountain, triathlon, and electric bikes.

Figure 2:
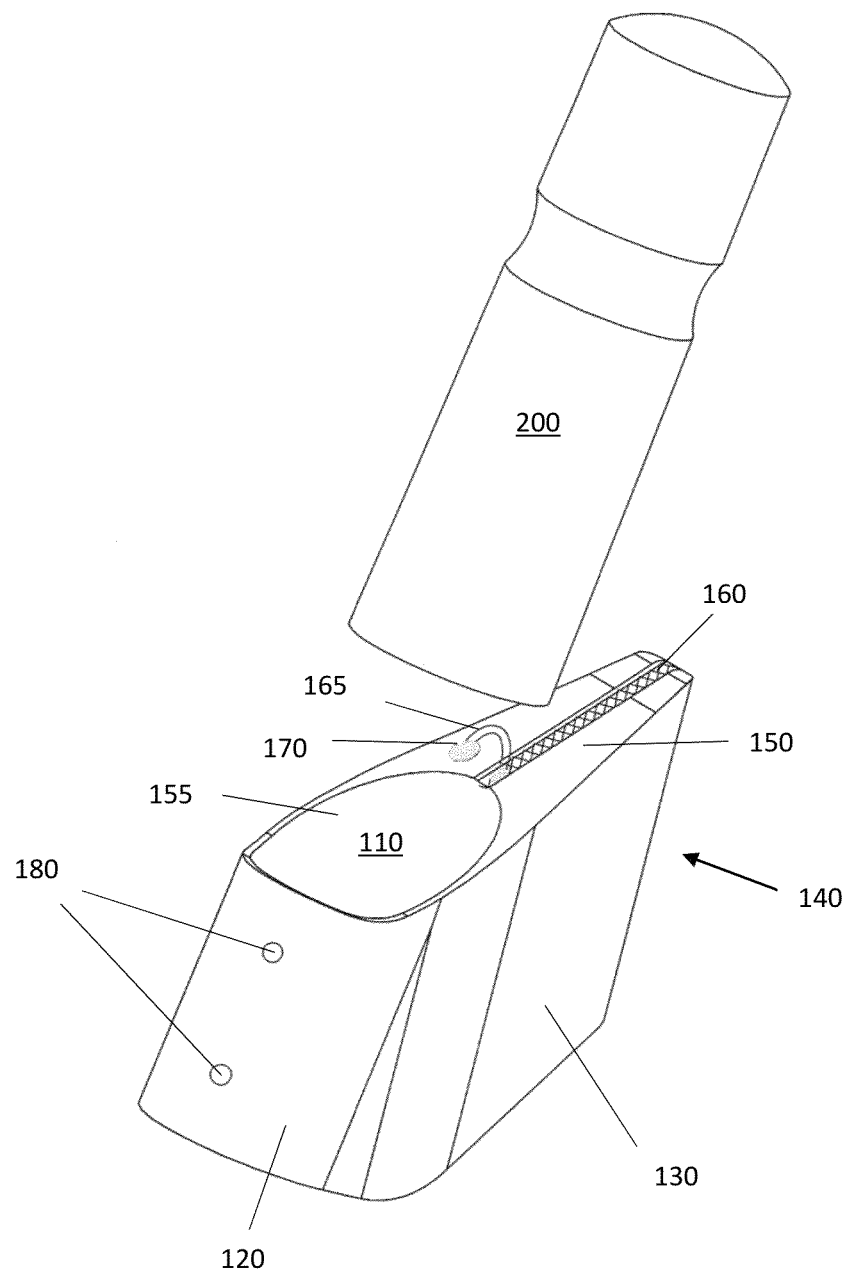
Figure 3:
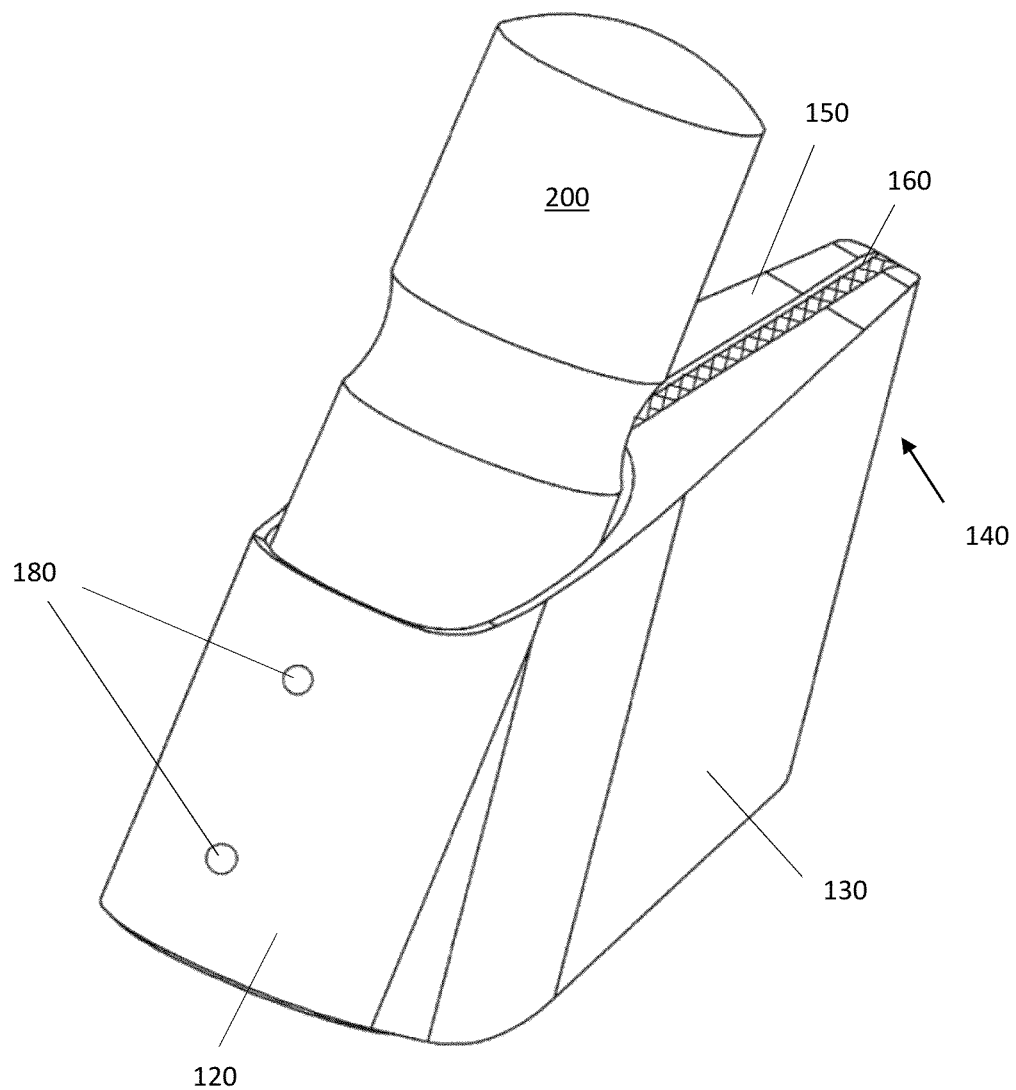

FIGS. 1-3 illustrate an aerodynamic storage 100 for a fluid bottle 200 according to an embodiment of the invention. Here, the aerodynamic storage 100 comprises an aperture 110, a front section 120, and two side sections 130 (opposite of one another, one of which is obscured from view in the figure) adjoined to the front section 120. The front section 120 is rounded on its edges adjoining the side sections 130. The two side sections 130 taper off to a rear section 140. The bottom edges of the two side sections 130 are preferably curved or rounded at the rear section 140 as shown. The aerodynamic storage 100 further comprises a top section 150 adjoined to the two side section 130 and rear section 140, as well as an inner aperture section 155. A zipper 160 is provided that travels from the top section 150 to the rear section 140. A zipper pull 165 is provided to open and close the zipper 160 in order to respectively access and secure an internal compartment for storing storage items such as, but not limited to repair items, personal items, and/or food. In an optional embodiment of the invention, the zipper pull 165 can be secured to the top section 150 via Velcro 170. For example, the top section 150 may include a Velcro strip of patch (covered with tiny loops) that attaches and detaches to a Velcro strip or patch (with tiny flexible hooks) affixed to the zipper pull 165.

In an exemplary embodiment of the invention, the aerodynamic storage 100 is a pouch formed from flexible material such as nylon or polyester. However, other types of materials may be used such as, but not limited to neoprene, leather, polypropylene, vinyl, or any type of rubber or plastic. The front section 120, two side sections 130, rear section 140, top section 150, aperture section 155, and bottom section (hidden from view) are stitched and/or glued together. In another exemplary embodiment of the invention, the aerodynamic storage is constructed from a rigid material such as plastic or carbon fiber.

Figure 4:
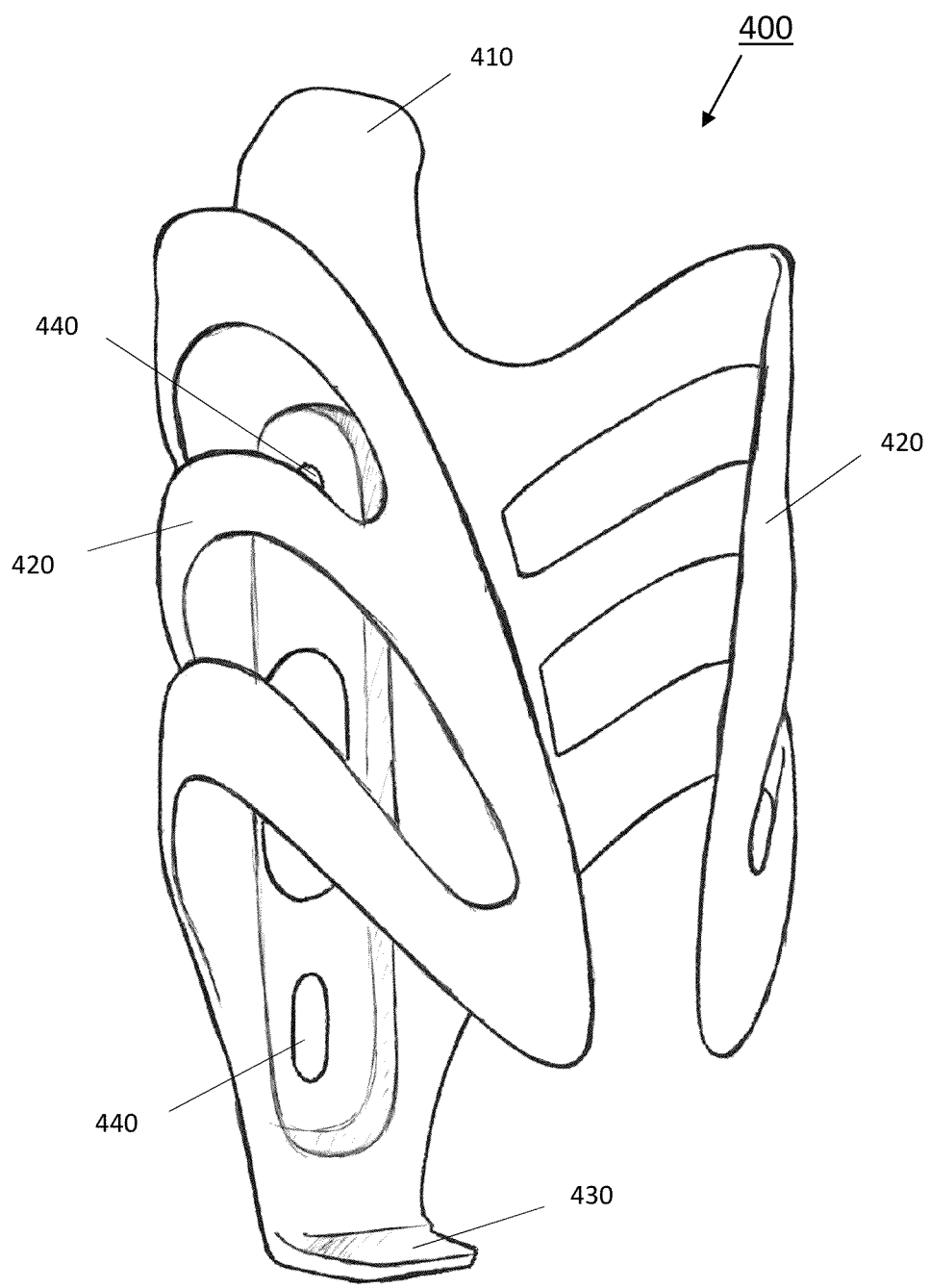
FIG. 4 illustrates a bottle carrier for use with the aerodynamic storage of FIG. 1.
Figure 5:
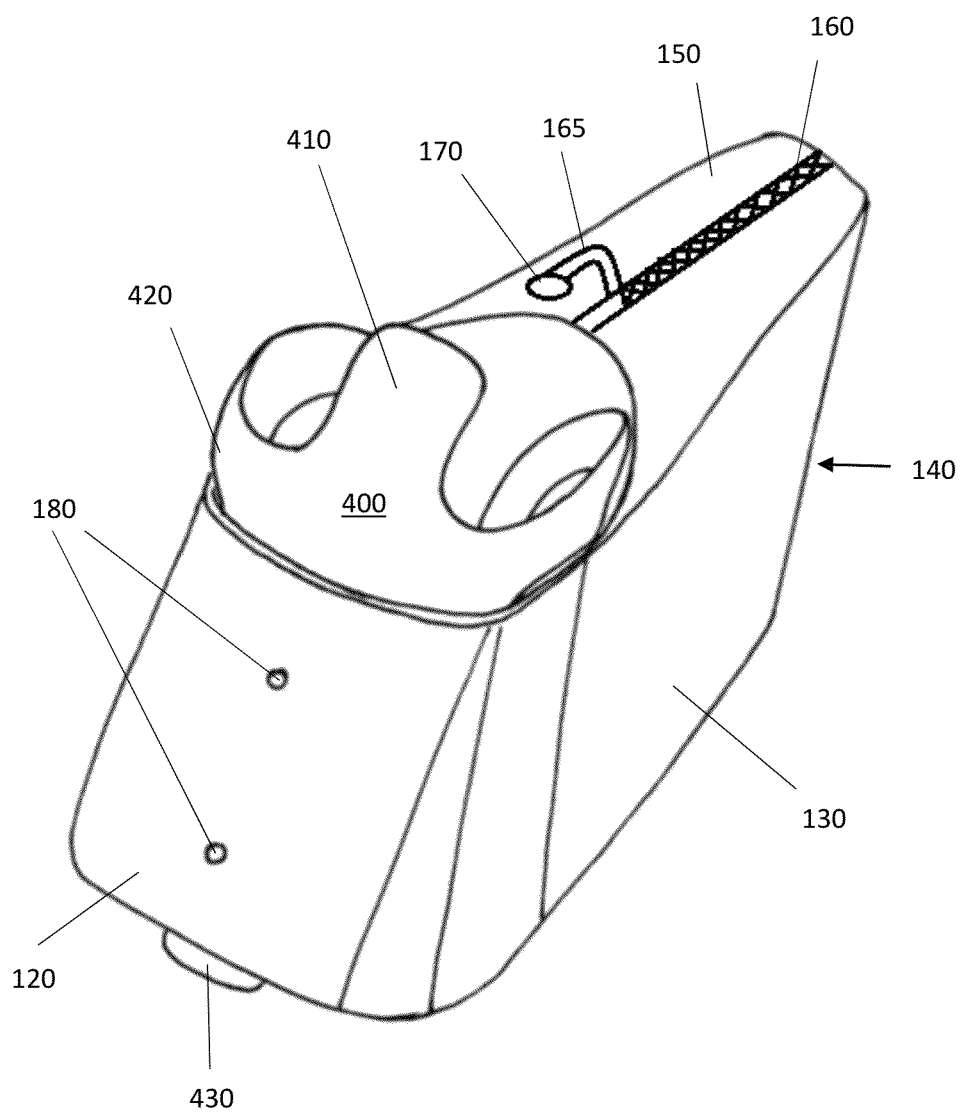
FIG. 5 illustrates the aerodynamic storage of FIG. 1 with the bottle carrier of FIG. 4.

The aperture 110 can be sized to fit any type of fluid bottle 200. In an embodiment of the invention, the diameter of the aperture 110 is configured to receive a three inch (3") diameter fluid bottle 200 as shown in FIGS. 2 and 3. The aperture 110 is also large enough to accommodate the fluid bottle 200 and its respective carrier. Any type of bottle carrier may be used. For example, FIG. 4 illustrates a bottle carrier 400, which is commercially available from XLAB under the brand name Gorilla Cage™. The bottle carrier 400 is constructed out of lightweight carbon fiber. To prevent the fluid bottle 200 from ejecting on bumpy roads, the bottle carrier includes a stiff top lip 410 and tall gripping sides 420 for a seven pound (7 lb.) grip on the bottle 200. A thick shelf 430 is provided to prevent the bottle 200 from falling downward. As shown in FIG. 5, the bottle carrier 400 is disposed within the aperture 110 and mounted to the bicycle via hardware, e.g., screws, placed through openings 440 and respective holes 180 located on the front surface of the aerodynamic storage. Other types of fasteners or hardware, the identification and implementation of which is apparent to one of ordinary skill in the art, may be used to fasten the bottle carrier 400 and aerodynamic storage 110 to a bicycle.

Figure 6:
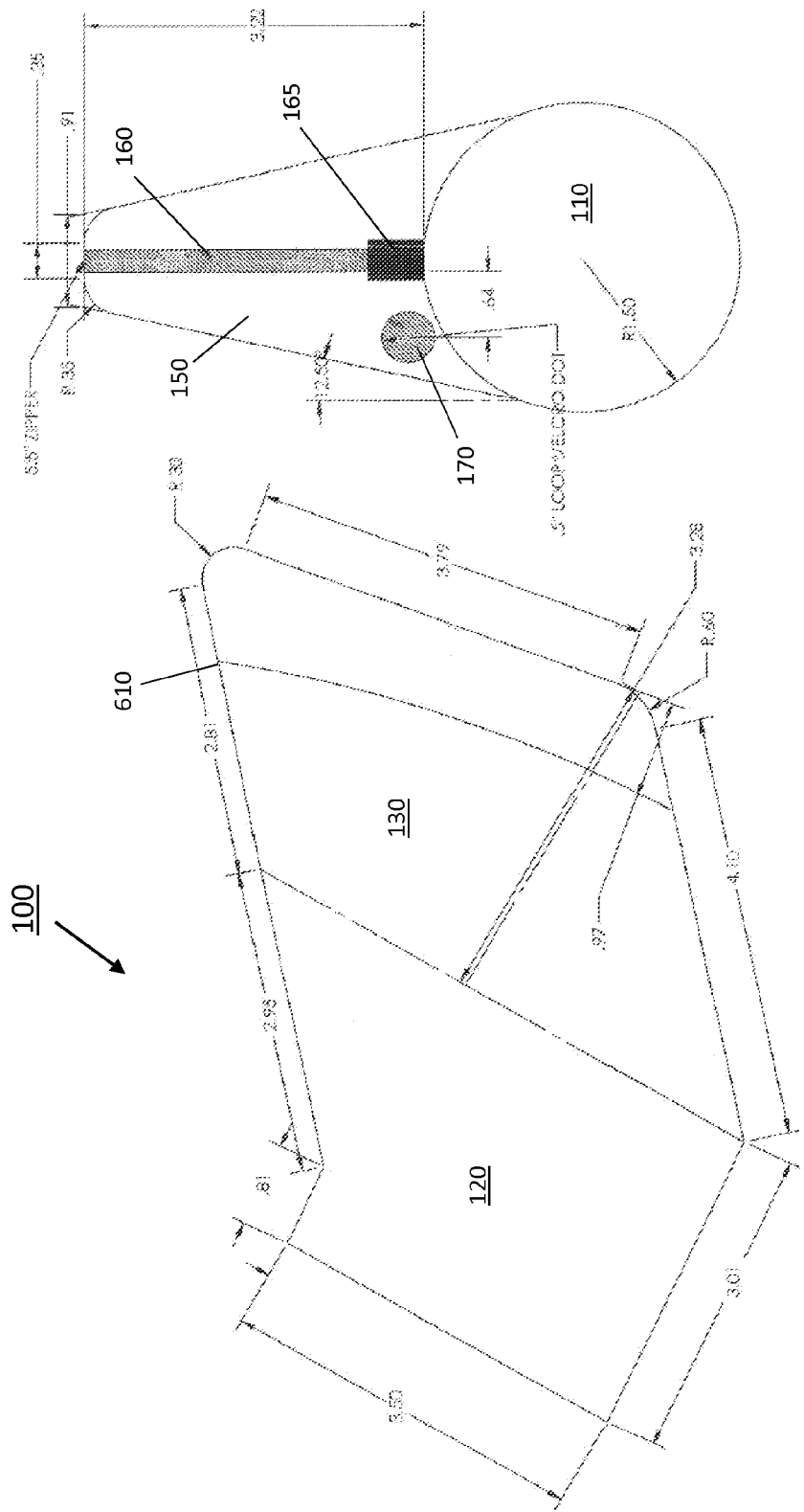
FIG. 6 illustrates exemplary dimensions of the aerodynamic storage of FIG. 1.

FIG. 6 illustrates exemplary dimensions of the aerodynamic storage 100. The dimensions are listed in inches. An optional pocket 610 can be included on each side section 130 for receiving a plastic insert in order to stiffen those sections if the aerodynamic storage 100 is constructed as a flexible pouch. These pockets 610 may also be used as storage compartments. The dimensions provided are exemplary only— one of ordinary skill in the art appreciates that various dimensions can be utilized. For example, in another embodiment of the invention, the front section 120, the two side sections 130, and the aperture section 155 form a large enough aperture 110 to fit the entire height of the fluid bottle 200. In other words, the aperture 110 is deep enough to receive the fluid bottle 200 so that the top of the fluid bottle is not exposed to air drag. In another embodiment of the invention, the aperture 110 is deep enough to receive the fluid bottle so that only the lid or top section of the fluid bottle 200 is exposed to air drag. The sections forming the aperture may be insulated to maintain a desired temperature of the fluid bottle 200. Various sections may also include reflective or fluorescent materials for increasing visibility of the aerodynamic storage.

Figure 7:
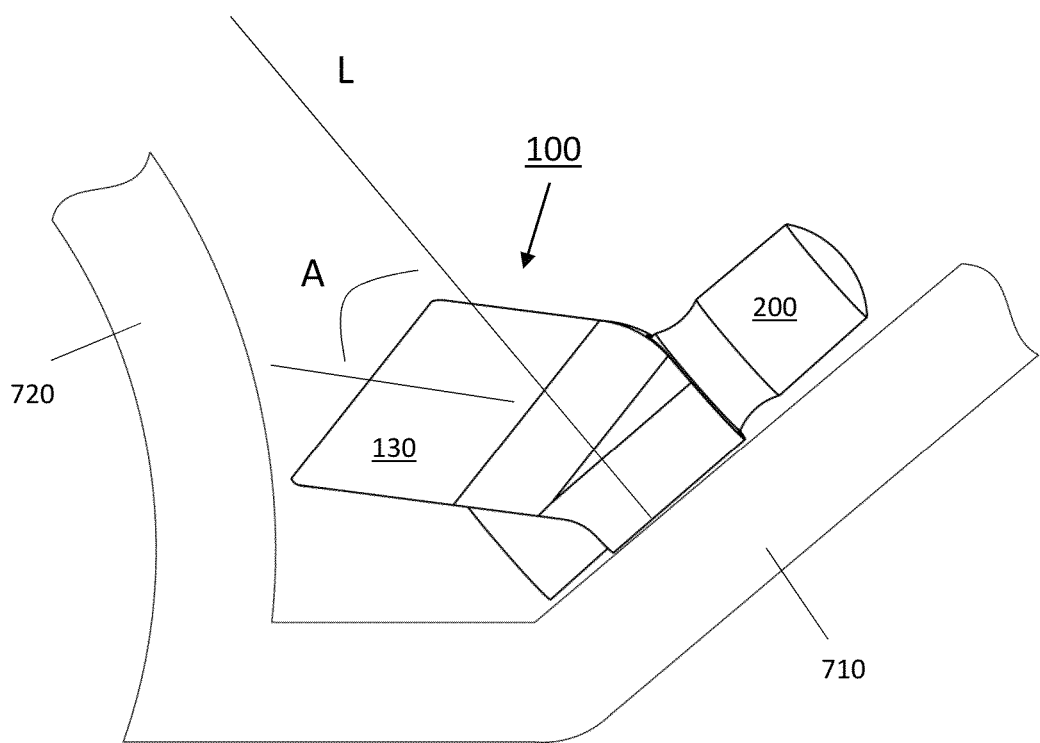
FIG. 7 illustrates the aerodynamic storage of FIG. 1 mounted to a bicycle frame according to an embodiment of the invention.

FIG. 7 illustrates the aerodynamic storage 100 mounted to a down tube 710 of a bicycle frame according to an embodiment of the invention. Here, the aerodynamic storage 100 is mounted (via a bottle carrier as described above, but not shown in this figure) to the down tube of the bicycle frame 710. As shown, the side sections 130 can be configured at an acute angle A downward from line L in order to decrease the coefficient of drag of the aerodynamic storage 100. The optimal angle A is one where the side sections are horizontal. Angle A may vary as different bicycles have differently angled down tubes. Alternatively, the aerodynamic storage 100 (along with a respective bottle carrier) can be mounted to a seat tube 720, a seat post (not shown), saddle (not shown), seat post clamp (not shown), or any other part of the bicycle.

In other embodiments of the invention, the bottle carrier 400 may be eliminated altogether. For example, the aperture section may 155 include bottle clips, a retainer, or foam to receive and snuggly hold the fluid bottle. In addition, zipper 160 and zipper pull 170 may be replaced with other closing means such as, but not limited to catches, a clamshell, snaps, magnets, hook and loop fasteners. Moreover, a lid section and spring mechanism (not shown) can be coupled to the top of the aperture 110, which would automatically close the aperture when no bottle is present. The lid section could be constructed from a rigid material. Furthermore, the aerodynamic storage 100 can be designed to accommodate two or more fluid bottles 200 by providing an equal number of side by side apertures 110.

The inventive concepts described herein are also applicable to horizontal bottles or hydration systems such as the revolutionary Torpedo™ system commercially available by XLAB.

Figure 8:
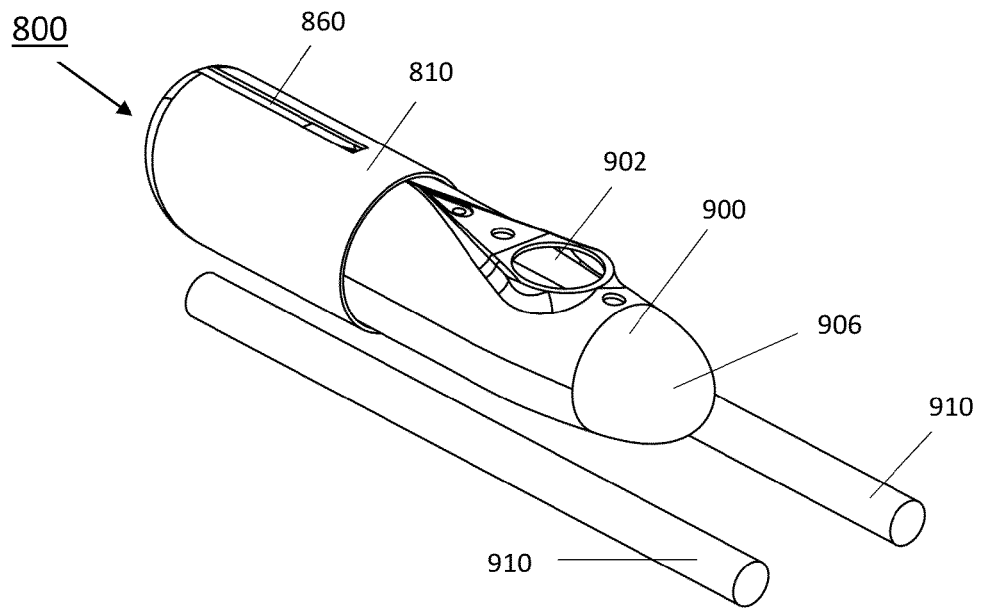
FIGS. 8-10 illustrate an aerodynamic storage 800 for a horizontal bottle 900 according to an embodiment of the invention.
Figure 9:
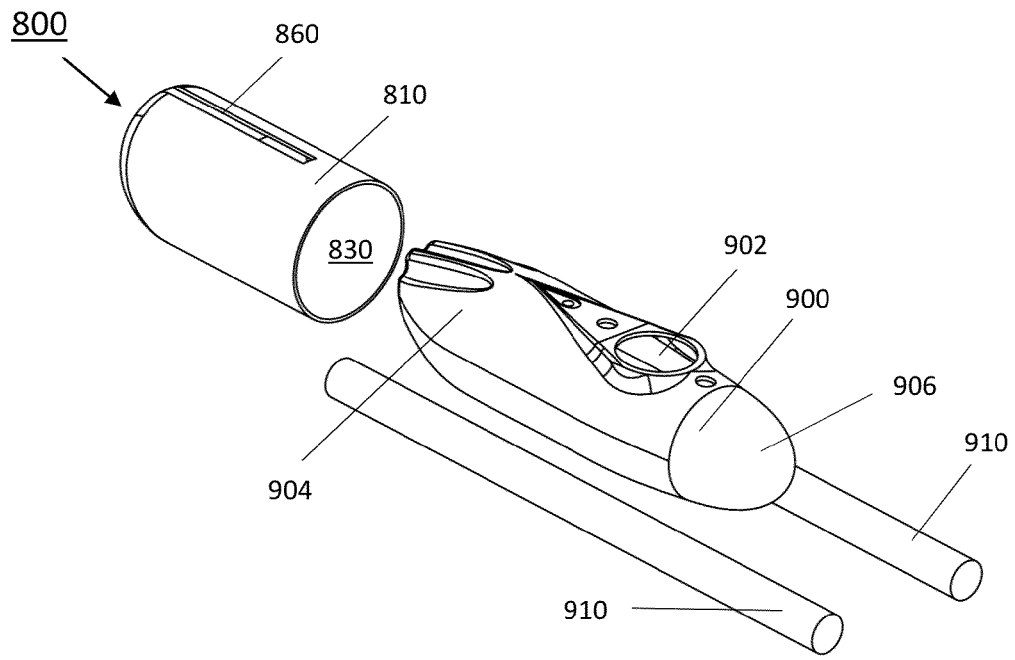
Figure 10:
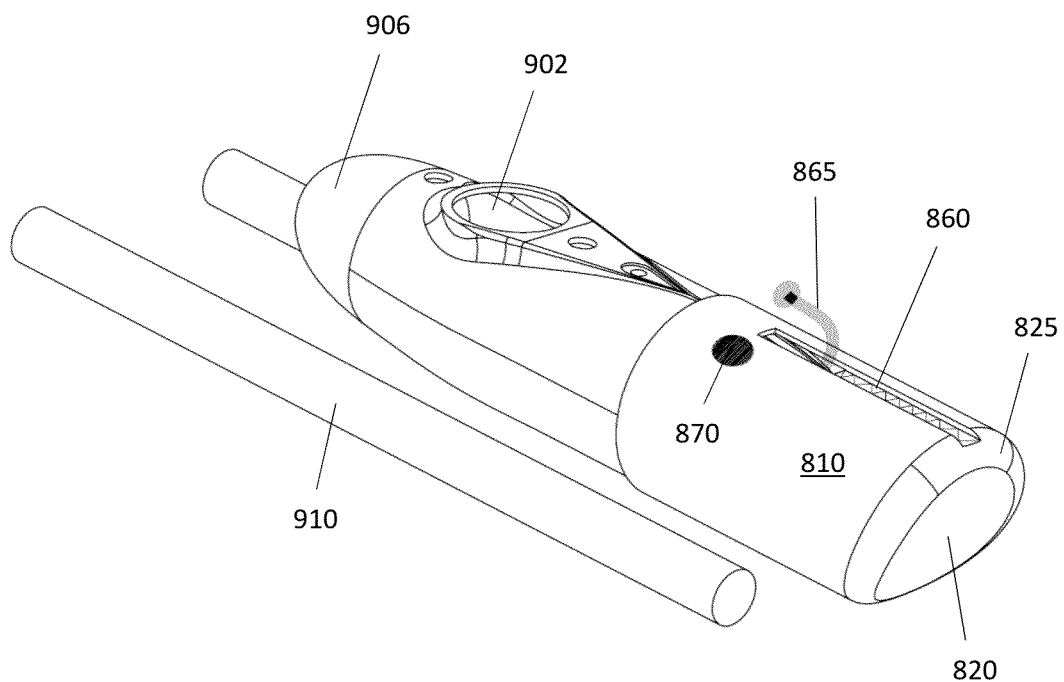

FIGS. 8-10 illustrate an aerodynamic storage 800 for a horizontal fluid container 900 according to an embodiment of the invention. Here, the aerodynamic storage 800 comprises a cylindrical section 810 coupled to a rear section 820 to form an aperture 830. FIG. 8 shows the aerodynamic storage 800 affixed to the horizontal fluid container 900. FIG. 9 shows the aerodynamic storage 800 detached from the horizontal fluid container 900, thereby exposing the aperture 830. The depth of the aperture 830 can vary according to the dimensions of the fluid container 900 and the desired coverage of the aerodynamic storage 800 over the fluid container 900. FIG. 10 shows a rear view of the aerodynamic storage 800 affixed to the horizontal fluid container 900.

In an embodiment of the invention, a zipper 860 is included on the cylindrical section 810 along with a zipper pull 865 in order to access or secure an internal compartment for storing storage items such as, but not limited to repair items, personal items, and/or food. In an optional embodiment of the invention, the zipper pull 865 can be secured to the cylindrical section 810 via Velcro 870. For example, the cylindrical section 810 may include a Velcro strip of patch (covered with tiny loops) that attaches and detaches to a Velcro strip or patch (with tiny flexible hooks) affixed to the zipper pull 865.

In an exemplary embodiment of the invention, the aerodynamic storage 800 is a pouch formed from flexible material such as nylon or polyester. However, other types of materials may be used such as, but not limited to neoprene, leather, polypropylene, vinyl, or any type of rubber or plastic. The cylindrical section 810 and rear section are stitched and/or glued together. In another exemplary embodiment of the invention, the aerodynamic storage 800 is constructed from a rigid material such as plastic or carbon fiber.

The aperture 830 can be sized to fit any type of horizontal fluid container 900. The horizontal fluid container 900 is coupled to a bicycle (not completely shown) via aero bars 910. Although any type of horizontal fluid container 900 may be used, a Torpedo™ aero bar horizontal hydration system is shown according to an exemplary embodiment of the invention. However, any type of horizontal fluid container can be used such as, but not limited to bottles and bladders. The Torpedo system comprises a lid 902, folding straw with bite valve (not shown), straw retainer (not shown), an aerodynamic tail 904, and a round nose 906. The horizontal fluid container 900 is attached to the aero bars 910 via a mount or cage (not shown).

The cylindrical section 810 can be secured to the horizontal fluid container 900 through a snug fit, i.e., the aperture 830 is sized appropriately to provide enough internal friction to prevent storage system 800 from sliding off the container 900 during usage. Alternatively, one or more fasteners (not shown) are used to secure the cylindrical section 810 to the fluid container 900. Exemplary fasteners include, but are not limited to Velcro straps, straps, clips, self-locating tab and hole systems (e.g., a tab located on the bottle 900 that fits into a hole on the storage 800), screws, adhesives, magnets, or any other type of fastener, the identification and implementation of which is apparent to one of ordinary skill in the art. As better shown in FIG. 10, the rear section 820 includes a rounded edge 825 (where the rear section 820 joins the cylindrical section 810) and slopes upward to reduce air drag.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An aerodynamic storage accessory for a bicycle comprising:
    a front section, two side sections, a bottom section, an aperture section, a top section, and a rear section;
    wherein the front section, the two side sections, and the aperture section form an aperture for receiving a fluid bottle;
    wherein the two side sections, the aperture section, the bottom section, and top section form a storage compartment; and
    wherein the two side sections taper off to the rear section.

2. The aerodynamic storage accessory of claim 1, further comprising a zipper located on the top section and rear section for opening and closing the storage compartment.

3. The aerodynamic storage accessory of claim 2, further comprising a zipper pull, wherein the top section comprises a Velcro strip for securing the zipper pull to the top section.

4. The aerodynamic storage accessory of claim 1, wherein the storage compartment is formed as a pouch.

5. The aerodynamic storage accessory of claim 4, wherein the two side sections each include a pocket.

6. The aerodynamic storage accessory of claim 1, wherein the aperture is configured to receive a bottle carrier.

7. The aerodynamic storage accessory of claim 6, wherein the bottle carrier can be affixed to a frame of the bicycle through the front section.

8. The aerodynamic storage accessory of claim 1, further comprising stitching to join together two or more of the sections selected from the group consisting of: the front section, two side sections, the bottom section, the aperture section, the top section, and the rear section.

9. The aerodynamic storage accessory of claim 1, further comprising a lid for closing a top of the aperture.

10. The aerodynamic storage accessory of claim 9, wherein the lid is spring activated and automatically closes when a fluid bottle is not present.

11. An aerodynamic storage accessory for a bicycle comprising:
    a cylindrical section and a rear section, wherein the cylindrical section and rear section form an aperture for receiving a horizontal fluid container;
    wherein the rear section comprises a storage compartment; and
    wherein the rear section has an aerodynamic shape.

12. The aerodynamic storage accessory of claim 11, further comprising a zipper located on the cylindrical section for opening and closing the storage compartment.

13. The aerodynamic storage accessory of claim 12, further comprising a zipper pull, wherein the cylindrical section comprises a Velcro strip for securing the zipper pull to the cylindrical section.

14. The aerodynamic storage accessory of claim 11, wherein the storage compartment is formed as a pouch.

15. The aerodynamic storage accessory of claim 11, wherein the rear section has a rounded edge and slopes upward from front to rear.

* * * * *